United States Patent
Eichenberger et al.

(10) Patent No.: US 8,954,943 B2
(45) Date of Patent: Feb. 10, 2015

(54) ANALYZE AND REDUCE NUMBER OF DATA REORDERING OPERATIONS IN SIMD CODE

(75) Inventors: Alexandre E. Eichenberger, Chappaqua, NY (US); Kai-Ting Amy Wang, North York (CA); Peng Wu, Mt. Kisco, NY (US); Peng Zhao, East York (CA)

(73) Assignee: International Business Machines Corporation, Armonk, NY (US)

( * ) Notice: Subject to any disclaimer, the term of this patent is extended or adjusted under 35 U.S.C. 154(b) by 2778 days.

(21) Appl. No.: 11/340,452

(22) Filed: Jan. 26, 2006

(65) Prior Publication Data

US 2007/0192762 A1    Aug. 16, 2007

(51) Int. Cl.
*G06F 9/45* (2006.01)
*G06F 15/00* (2006.01)
*G06F 15/76* (2006.01)

(52) U.S. Cl.
CPC ...................................... *G06F 8/443* (2013.01)
USPC .............. 717/152; 717/155; 717/157; 712/22

(58) Field of Classification Search
None
See application file for complete search history.

(56) References Cited

U.S. PATENT DOCUMENTS

| | | | |
|---|---|---|---|
| 6,553,485 B2 | 4/2003 | Janik et al. | |
| 6,834,295 B2 | 12/2004 | Barry et al. | |
| 6,886,091 B1 * | 4/2005 | Vissers et al. | 717/140 |
| 7,085,795 B2 * | 8/2006 | Debes et al. | 712/E9.017 |
| 7,367,026 B2 | 4/2008 | Eichenberger et al. | |
| 7,386,842 B2 | 6/2008 | Eichenberger et al. | |
| 7,395,531 B2 | 7/2008 | Eichenberger et al. | |
| 8,423,979 B2 | 4/2013 | Archambault et al. | |
| 2003/0084082 A1 * | 5/2003 | Debes et al. | 708/420 |
| 2003/0167460 A1 * | 9/2003 | Desai et al. | 717/151 |
| 2004/0267857 A1 | 12/2004 | Abel et al. | |
| 2006/0047770 A1 | 3/2006 | Marappan et al. | |
| 2006/0052116 A1 | 3/2006 | Bhogal et al. | |
| 2006/0080486 A1 | 4/2006 | Yan | |
| 2006/0155705 A1 | 7/2006 | Kamper et al. | |

OTHER PUBLICATIONS

Kudriavtsev, Alexei and Peter Kogge. "Generation of Permutations for SIMD Processors." Jun. 15, 2005. ACM, Proceedings of the 2005 ACM SIGPLAN/SIGBED conference on Languages, compilers, and tools for embedded systems. pp. 147-156. Retrieved from http://portal.acm.org on Oct. 20, 2009.*

(Continued)

*Primary Examiner* — Don Wong
*Assistant Examiner* — Erika Kretzmer
(74) *Attorney, Agent, or Firm* — Yee & Associates, P.C.; Ryan Lewis (57) ABSTRACT

A method for analyzing data reordering operations in Single Issue Multiple Data source code and generating executable code therefrom is provided. Input is received. One or more data reordering operations in the input are identified and each data reordering operation in the input is abstracted into a corresponding virtual shuffle operation so that each virtual shuffle operation forms part of an expression tree. One or more virtual shuffle trees are collapsed by combining virtual shuffle operations within at least one of the one or more virtual shuffle trees to form one or more combined virtual shuffle operations, wherein each virtual shuffle tree is a subtree of the expression tree that only contains virtual shuffle operations. Then code is generated for the one or more combined virtual shuffle operations.

20 Claims, 7 Drawing Sheets

(56) References Cited

OTHER PUBLICATIONS

Ren, Gang, Peng Wu and David Padua. "Optimizing data permutations for SIMD devices." ACM, Proceedings of the 2006 ACM SIGPLAN conference on Programming language design and implementation. pp. 118-131. Retrieved from http://portal.acm.org on Oct. 20, 2009.*
U.S. Appl. No. 10/932,753, filed Sep. 2, 2004, Eichenberger et al.
U.S. Appl. No. 10/919,115, filed Aug. 16, 2004, Wu et al.
U.S. Appl. No. 10/960,585, filed Oct. 7, 2004, Yan.
U.S. Appl. No. 10/937,690, filed Sep. 9, 2004, Bhogal et al.
U.S. Appl. No. 11/032,184, filed Jan. 10, 2005, Bhogal et al.
U.S. Appl. No. 10/918,879, filed Aug. 16, 2004, Eichenberger et al.
Eichenberger et al., "Vectorization for SIMD Architectures with Alignment Constraints", ACM Digital Library, 2004, pp. 82-93.
Du et al., "Interactive Ray Tracing on Reconfigurable SIMD MorphoSys", INSPEC, AN-7792508, 2003. http://doi.ieeecomputersociety.org/10.1109/DATE.2003.1186686.
Bik et al., "Automatic Intra-Register Vectorization for the Intel Architecture," International Journal of Parallel Programming, vol. 30, No. 2, Apr. 2002, pp. 65-98.
Larsen et al. "Exploiting Superword Level Parallelism with Multimedia Instruction Sets," Proceedings of the ACM SIGPLAN 2000 Conference on Programming Language and Design and Implementation (PDLI '00), Jun. 2000, pp. 145-156.

* cited by examiner

FIG. 5
```
S0:  uint8_t INPUT1 [N], INPUT2 [N], OUTPUT [N];
     uint8_t alpha, oneMinusAlpha;
S1:  for (sampleIndex = 0; sampleIndex < sampleCount; sampleIndex++) {
S2:      uint16_t a1 = INPUT1[sampleIndex] * alpha;
S3:      uint16_t a2 = INPUT2[sampleIndex] * oneMinusAlpha;
S4:      uint8_t b1 = a1 >> 8;
S5:      uint8_t b2 = a2 >> 8;
S6:      OUTPUT[sampleIndex] = b1 + b2;
S7:  }
```

FIG. 6A
a) ORIGINAL SCALAR CODE

FIG. 6B
b) AFTER SIMDIZATION

```
S0:   uint16_t INPUT [N];
S1:   uint32_t OUTPUT[N];
S2:   for (i = 0; i < N-5; i++) {
S3:       OUTPUT[i] = INPUT [i+5];
S4:   }
```

```
S0:  unsigned int a[256];
S1:  unsigned short b[256];
S2:  unsigned int mask = 0x000fffff;
S3:  for (int i = 0; i < 256; i++)
S4:     b[i] = a[i+3] & mask;
```

ANALYZE AND REDUCE NUMBER OF DATA REORDERING OPERATIONS IN SIMD CODE

This invention was made with government support under National Security Agency Contract Number H98230-04-C-0920. THE GOVERNMENT HAS CERTAIN RIGHTS IN THIS INVENTION.

BACKGROUND OF THE INVENTION

1. Field of the Invention

The present invention relates generally to a data processing system and more specifically to a method, computer program product and system for analyzing and reducing byte movement operations in SIMD code.

2. Description of the Related Art

Modern processors use Single Issue Multiple Data (SIMD) units to significantly increase the processing throughputs without having to increase their issue bandwidth. Since multiple data can be processed in one computation, SIMD architecture often provides various data reordering operations, to organize the data into the desired location of the wide register prior to processing.

Currently, solutions exist that minimize the data reordering operations introduced exclusively for realignment purposes. However, none of these solutions is capable of handling other types of data reordering operations nor do the solutions address combining different data reordering operations to reduce the number of data reordering operations present in SIMD code.

For SIMD architectures such as Vector/SIMD Multimedia extension (VMX) or Synergistic Processing Unit (SPU), only loads and stores from vector length aligned memory addresses are supported. Such architectures are referred to as SIMD architectures with alignment constraints. For SIMD architectures with alignment constraints, a valid "SIMDization" may introduce a data reorganization operation per misaligned loads and stores. "SIMDization" is vectorization for SIMD architectures. Thus, alignment handling is a common cause of implicit data reordering operations (discussed further below) present in SIMD code.

SUMMARY OF THE INVENTION

The present invention provides a method, computer program product and system for analyzing data reordering operations in Single Issue Multiple Data source code and generating executable code therefrom. Input is received. One or more data reordering operations in the input are identified and each data reordering operation in the input is abstracted into a corresponding virtual shuffle operation so that each virtual shuffle operation forms part of an expression tree. One or more virtual shuffle trees are collapsed by combining virtual shuffle operations within at least one of the one or more virtual shuffle trees to form one or more combined virtual shuffle operations, wherein each virtual shuffle tree is a subtree of the expression tree that only contains virtual shuffle operations. Then code is generated for the one or more combined virtual shuffle operations.

BRIEF DESCRIPTION OF THE DRAWINGS

The novel features believed characteristic of the invention are set forth in the appended claims. The invention itself, however, as well as a preferred mode of use, will best be understood by reference to the following detailed description of an illustrative embodiment when read in conjunction with the accompanying drawings, wherein:

DETAILED DESCRIPTION OF THE PREFERRED EMBODIMENT

Several data reordering operations can often be combined into one operation and still achieve the same effect. The following loop illustrates this point:

```
unsigned char INPUT[N], OUTPUT[N], alpha;
for (i = 0; i < N; i++) {
    unsigned short a1 = INPUT[i] * alpha;
    OUTPUT[i] = a1 >> 8;
}
```

There is an explicit data movement expressed by the right shift operation. Furthermore, both statements in the loop involve data conversion between different lengths. Specifically, in the first statement, INPUT[i] is promoted from unsigned char to unsigned short before being multiplied. In the second statement, the shifted result, a1, is converted to unsigned char before being stored to memory. While data conversion in scalar code is often free (i.e. existence of load half and zero instruction), it is not the case with SIMD code. SIMD code requires performing unpacking and packing of the data in vector registers, which is often referred to as an implicit data movement operation. In the example loop above, the packing operation can be combined with the right shift operation into one data reorganization operation, saving a step.

FIGS. 1-4 are provided as exemplary diagrams of data processing environments in which aspects of the exemplary embodiments may be implemented. It should be appreciated that FIGS. 1-4 are only exemplary and are not intended to assert or imply any limitation with regard to the environments in which aspects or embodiments of the invention may be implemented. Many modifications to the depicted environments may be made without departing from the spirit and scope of the illustrative embodiments.

Figure 1:
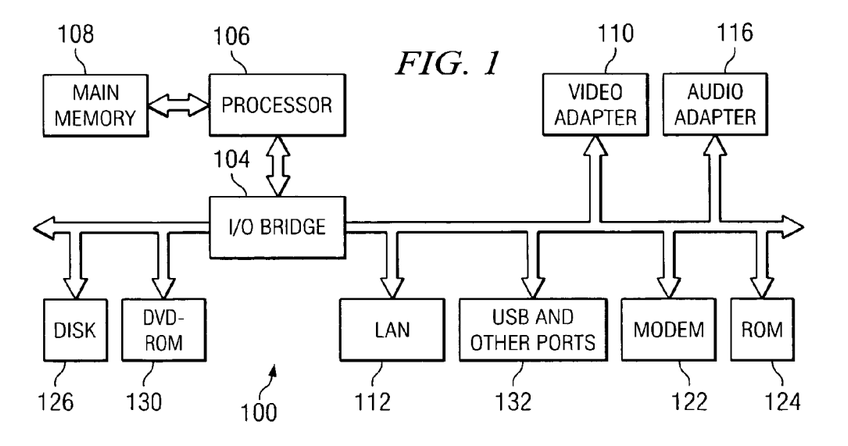
FIG. 1 is a block diagram of a data processing system in which aspects of the exemplary embodiments may be implemented.

With reference now to the figures, FIG. 1 is a block diagram of a data processing system in which aspects of the exemplary embodiments may be implemented. Data processing system 100 is an example of a computer in which code or instructions implementing the processes of the exemplary embodiments of the invention may be located. In the depicted example, data processing system 100 employs a hub architecture including an I/O bridge 104. Processor 106 is coupled directly to main memory 108, and processor 106 is also coupled to I/O bridge 104.

In the depicted example, video adapter 110, local area network (LAN) adapter 112, audio adapter 116, modem 122, read only memory (ROM) 124, hard disk drive (HDD) 126, DVD-ROM drive 130, universal serial bus (USB) ports and other communications ports 132 may be coupled to I/O bridge 104. ROM 124 may be, for example, a flash binary input/output system (BIOS). Hard disk drive 126 and DVD-ROM drive 130 may use, for example, an integrated drive electronics (IDE) or serial advanced technology attachment (SATA) interface.

An operating system or specialized program may run on processor 106 and is used to coordinate and provide control of various components within data processing system 100 in FIG. 1. Instructions for the operating system or specialized program or programs are located on storage devices, such as hard disk drive 126, and may be loaded into main memory 108 for execution by processor 106. The processes of the exemplary embodiments may be performed by processor 106 using computer implemented instructions, which may be located in a memory such as, for example, main memory 108, read-only memory 124, or in one or more peripheral devices such as hard disk drive 126 or DVD-ROM drive 130.

The hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the present invention may be applied to a multiprocessor data processing system.

For example, data processing system 100 may be a general purpose computer, a video game console or other entertainment device, or a server data processing system. The depicted example in FIG. 1 and above-described examples are not meant to imply architectural limitations. For example, data processing system 100 also may be a personal digital assistant (PDA), tablet computer, laptop computer, or telephone device.

Figure 2:
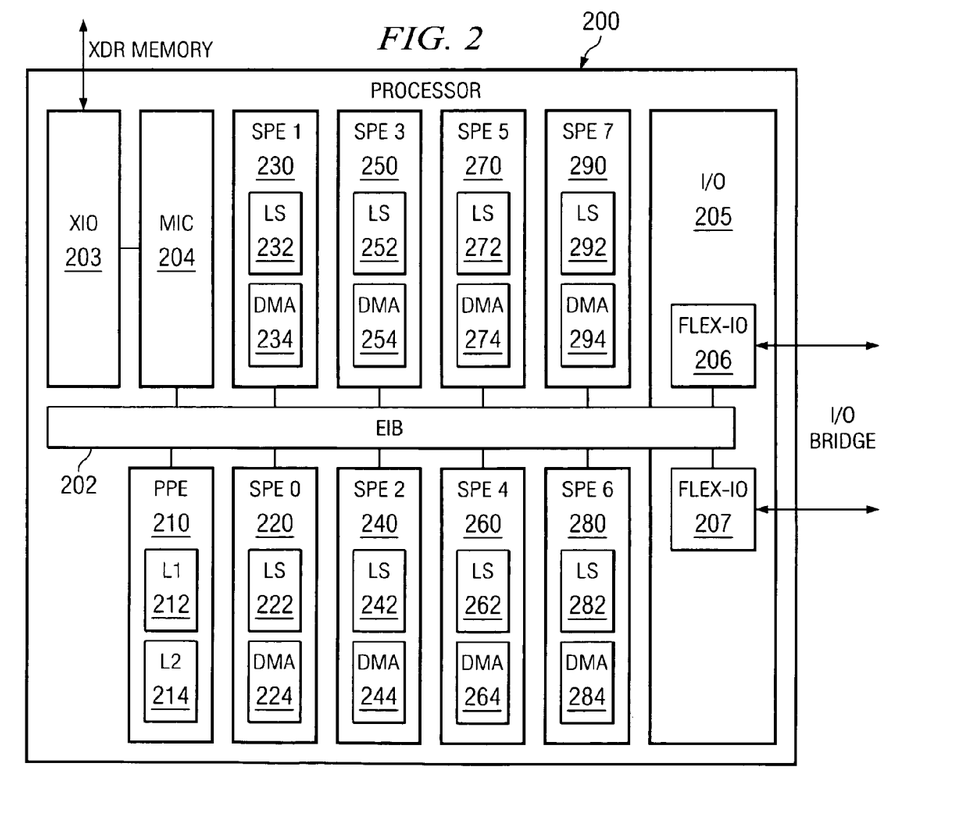
FIG. 2 is an exemplary diagram of a cell processor in which aspects of the illustrative embodiments may be implemented.

FIG. 2 is an exemplary diagram of a cell processor in which aspects of the illustrative embodiments of the invention may be implemented. Cell processor 200 is a single-chip multi-processor implementation directed toward distributed processing targeted for media-rich applications such as game consoles, desktop systems, and servers. The word "cell" as used herein generally denotes a heterogeneous processor type or a multiple core processing engine, such as Cell Broadband Engine, for example. Exemplary embodiments should not be limited to any exact architecture depicted in any drawing. Cell processor 200 may be, for example, processor 106 in FIG. 1.

Cell processor 200 may be logically separated into the following functional components: Power PC® processor element (PPE) 210 and synergistic processor elements (SPE) 220, 230, 240, 250, 260, 270, 280, and 290. Although synergistic processor elements and Power PC® processor elements are shown by example, any type of processor element may be supported. Exemplary cell processor 200 implementation includes one Power PC® processor element 210 and eight synergistic processor elements 220, 230, 240, 250, 260, 270, 280, and 290. The synergistic processor aspect (SPE) of cell processor 200 is an implementation of a new processor architecture designed to accelerate media and data streaming workloads.

In the example depicted in FIG. 2, an appropriate analogy is to view SPEs as comprising the "orchestra" and to view the PPE as the "conductor". Continuing this analogy, the application developer may be viewed as the "composer". Each SPE has greater bandwidth and performance than the PPE. Code may be written to use each SPE for frequently repeated tasks with good data locality. Developers may also write code to use data flow paradigms to orchestrate SPE task execution. The PPE controls and sets up the global synchronization. The operating system runs on the PPE and allocates resources, controls devices, and provides system services. Developers may write code to use the PPE for less frequently repeated tasks with more random data access. Data flow and synchronization are important for ensuring good performance.

Each synergistic processor element includes its own local store (LS) area 222, 232, 242, 252, 262, 272, 282, and 292 and a dedicated direct memory access controller (DMA) 224, 234, 244, 254, 264, 274, 284, and 294. Once again, although synergistic processor elements are shown by example, any type of processor unit may be supported. PPE 210 includes L1 cache 212 and L2 cache 214.

Additionally, cell processor 200 implements element interconnect bus (EIB) 202 and other I/O structures to facilitate on-chip and external data flow. Element interconnect bus 202 serves as the primary on-chip bus for PPE 210 and SPEs 220, 230, 240, 250, 260, 270, 280, and 290. In addition, EIB 202 interfaces with other on-chip interface controllers that are dedicated to off-chip accesses. The on-chip interface controllers include memory interface controller (MIC) 204, extreme data rate I/O (XIO) memory channels 203, and I/O 205, which provides two high-speed external I/O channels, flex-IO 206 and flex-IO 207. The two high-speed external I/O channels are coupled to a plurality of application specific integrated circuit (ASIC) cell (RRAC) interfaces, such as Rambus FlexIO™ processor buses offered by Rambus Incorporated, located in Los Altos, Calif., providing the flexible input and output for cell processor 200.

Each SPE has a corresponding local store area. Each individual SPE can execute instructions (including data load and store operations) only from within its associated local store area. For this reason, all required data transfers to or from storage elsewhere in a system is performed using memory flow controller direct memory access operations via dedicated memory flow controllers 224, 234, 244, 254, 264, 274, 284, 294.

A program running on an SPE only references its own local store area using a local store address. However, each SPE's local store area is also assigned a real address (RA) within the overall system's memory map. This allows privileged software to map a local store area to the effective address (EA) of a process to facilitate direct memory access transfers between the local store of one synergistic processor unit and the local store of another synergistic processor unit. PPE 210 may also directly access any SPE's local store using an effective address.

The memory flow controller direct memory access data transfer commands use one local store address and one effective address. The local store address directly addresses the local store memory of the associated SPE corresponding to the memory flow controller command queues on which the direct memory access command request is placed. However, the effective address may be arranged to access any other memory storage area in the system, including local store areas of the other SPEs.

Main storage is shared by PPE 210, SPEs 220, 230, 240, 250, 260, 270, 280, 290, and I/O devices (not shown) in a system. All information held in this level of storage is visible to all processors and devices in the system. Programs reference this level of storage using an effective address. Since the memory flow controller SPE command queue and the memory flow controller proxy command queue and control and status facilities are mapped to the effective address space, it is possible for PPE 210 to initiate direct memory access operations involving a local store area associated with any of the SPEs.

A SPE program accesses main storage by generating and placing a data transfer command, with the appropriate effective address and local store address, into its DMA command queue for execution. When executed, the required data are transferred between the SPE's own local store area and main storage. DMA memory controllers 224, 234, 244, 254, 264, 274, 284, 294 provide a second proxy command queue for commands generated by other devices such as PPE 210. A proxy command queue is typically used to store a program in local storage prior to starting the SPE. Proxy commands can also be used for context store operations.

The effective address part of the data transfer is much more general and can reference main storage, including all SPE local store areas. These local store areas are mapped into the effective address space. The data transfers are protected. An effective address is translated to a real address through a memory management unit. The translation process allows for virtualization of system memory and memory protection.

DMA controllers 224, 234, 244, 254, 264, 274, 284, 294 provide two main functions for SPEs 220, 230, 240, 250, 260, 270, 280, 290, respectively. DMAs move data between SPE local store areas and main storage. Additionally, DMA controllers provide synchronization facilities between SPEs and other devices in the system.

Element interconnect bus 202 provides a communication path between all of the processors on cell processor 200 and the external interface controllers attached to EIB 202. Memory interface controller 204 provides an interface between EIB 202 and XIO memory channel(s) 203. Extreme data rate (XDR™) dynamic random access memory (DRAM) is a high-speed, highly serial memory provided by Rambus Incorporated, located in Los Altos, Calif. The XDR memory is accessed using a macro provided by Rambus. MIC 204 is a slave on element interconnect bus 202. MIC 204 acknowledges commands in its configured address range(s), corresponding to the memory in the supported hubs.

Flex I/O controllers 206 and 207 manage data transfer on and off the chip from EIB 202 to external devices. Flex I/O controllers 206 and 207 may exchange non-coherent traffic with an I/O device, or it can extend EIB 202 to another device, which could even be another cell processor. When used to extend the element interconnect bus, coherency is maintained between caches in the cell processors and caches in the external device attached. Maintaining coherency means ensuring that all cached copies of data are true reflections of the data in memory. The usual solution is to ensure that, when one copy is changed, all other copies are automatically marked as invalid so that they will not be used.

I/O interface controller 205 handles commands that originate in an I/O interface device and that are destined for the coherent element interconnect bus 202. An I/O interface device may be any device that attaches to an I/O interface such as an I/O bridge chip that attaches multiple I/O devices or another cell processor 200 that is accessed in a non-coherent manner. I/O interface controller 205 also intercepts accesses on element interconnect bus 202 that are destined to memory-mapped registers that reside in or behind an I/O bridge, such as I/O bridge 104 in FIG. 1, or non-coherent cell processor 200, and routes them to the proper I/O interface.

Although specific examples of how the different components may be implemented have been provided, this is not meant to limit the architecture in which the aspects of the illustrative embodiments of the present invention may be used. The aspects of the illustrative embodiments may be used with any multi-core processor system. A multi-core processor system is a system that integrates multiple processing units on a single chip.

Figure 3:
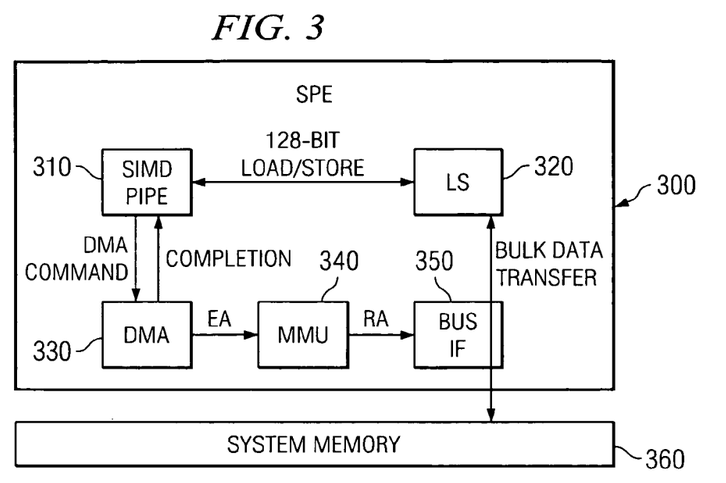
FIG. 3 is a block diagram illustrating an overview of a synergistic processor element in which aspects of the exemplary embodiments may be implemented.

FIG. 3 is a block diagram illustrating an overview of a synergistic processor element, such as one of SPE 220, 230, 240, 250, 260, 270, 280 or 290 in FIG. 2, in which aspects of the exemplary embodiments may be implemented. SPE 300 includes SIMD pipe 310, local store 320, direct memory access controller 330, memory management unit 340, and bus interface unit 350. Direct memory access controller 330 accesses protected memory space via MMU 340 using a real address (RA). DMA controller 330 saves and restores DMA context. DMA controller 330 also provides a synchronization mechanism compatible with general purpose processors.

A typical direct memory access command moves data between local store 320 and the system memory 360. System memory 360 is addressed by the effective address (EA) direct memory access command operand. Local store 320 is addressed by the local store address (LSA) direct memory access command operand. SIMD pipe 310 accesses local store 320 using 128-bit load/store commands in the depicted example.

System memory 360 may be, for example, an XDR DRAM as discussed above. In the illustrated example, system memory 360 may include the local store of other SPEs, multimedia input/output (MMIO) registers, and I/O device memories.

Figure 4:
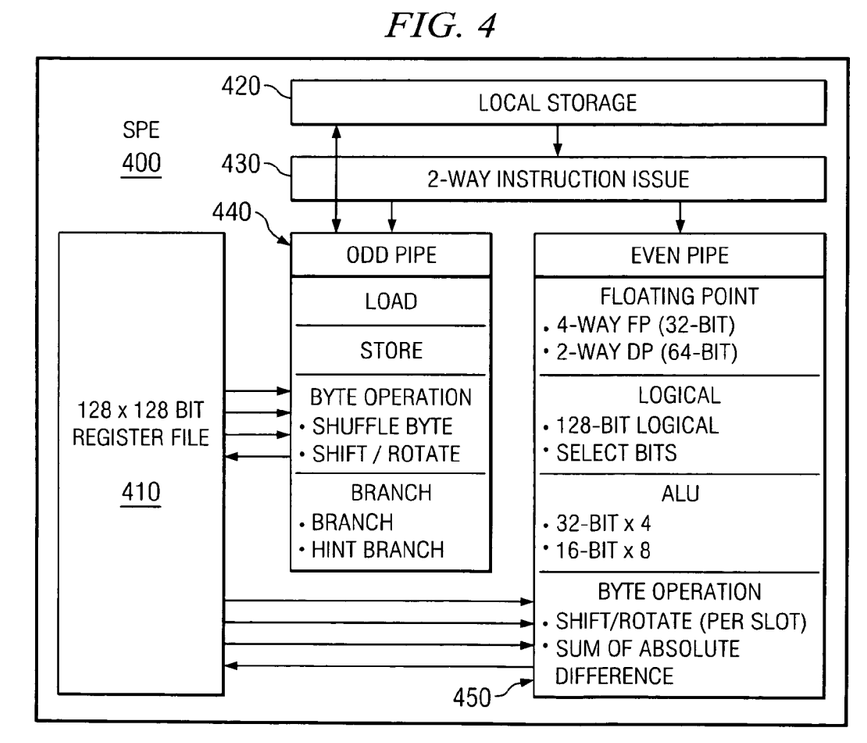
FIG. 4 is a block diagram illustrating an example of instruction processing in a synergistic processor element in accordance with the exemplary embodiments.

FIG. 4 is a block diagram illustrating an example of instruction processing in a synergistic processor, such as one of SPE 220, 230, 240, 250, 260, 270, 280 or 290 in FIG. 2, in accordance with the exemplary embodiments. SPE 400 stores instructions to be executed in local storage 420. Two-way instruction issue 430 issues instructions to odd pipe 440 and even pipe 450.

Odd pipe 440 performs load operations, store operations, byte operations, and branch operations on data from register file 410. As shown in the example of FIG. 4, register file 410 includes 128 registers that are 128 bits in length. Byte operations include shuffle byte operations and shift/rotate byte operations. Branch operations include an operation to take a branch and a hint branch operation.

Even pipe 450 performs floating point operations, logical operations, arithmetic logic unit (ALU) operations, and byte operations on data from register file 410. In the depicted example, floating point operations include four-way floating point (four 32-bit operations on a 128-bit register) and two-way double precision (DP) floating point (two 64-bit operations on a 128-bit register). Logical operations include 128-bit logical operations and select bits operations. ALU operations include 32-bit operations on four data portions of a 128-bit register and 16-bit operations on eight data portions of a 128-bit register. Byte operations for even pipe 450 include shift/rotate operations and sum of absolute difference operations.

As seen above, floating point operations and ALU operations, for example, may perform operations for which only portions of a register are useful or meaningful rather than the entire 128-bit register. Such operations are called "scalar operations." Combining several such scalar operations together so that the operations on the entire register are useful is vectorization. SPE 400 loads registers in register file 410 with numbers and the mathematical operation is performed on all data in a register, or even a set of registers, simultaneously.

Given the common nature of misaligned memory accesses, which may occur for a number of reasons, data conversion, especially in multimedia codes, and explicit byte manipulation operations inherent in the algorithm, reducing the number of data reorganizations will almost always lead to improvement in runtime performance of SIMD codes. In an exemplary embodiment, a method is provided for merging/fusing data movement operations in SIMD code generation. The method comprises four phases: (i) abstraction phase, (ii) clustering phase, (iii) combination phase, and (iv) code generation phase. In order to simplify discussion of an exemplary aspect of the present invention, it as assumed that the SIMD architecture is 16-byte wide.

The abstraction phase introduces an abstract layer of a virtual byte shuffle operation for all byte movement operations in order to see what the operations have in common. A shuffle operation mixes elements together, and a virtual byte shuffle operation is a virtual operation that mixes byte elements together. As an example, consider a virtual byte shuffle operation, vByteShuffle. The definition of vByteShuffle is as follows:

vByteShuffle(in1, in2, pattern).

The vByteShuffle accepts two input vectors, in1 and in2, of 16 bytes each. The bytes of the first input vector are numbered as n, n+1, . . . , n+15. The bytes of the second vector are numbered as m, m+1, . . . , m+15, where |m−n|>=16. This guarantees a unique numbering for each byte of the two vectors. The pattern vector, pattern, consists of sixteen numbers, with values ranging from n to n+15 and/or m to m+15. Each byte of the resulting vector is formed by selecting a numbered byte from the concatenated vector of in1 and in2 according to the values in the pattern vector. Take the example where in1 consists of sixteen elements numbered 0-15 that correspond to capital letters A-P such that element 0=A, 1=B, 2=C, etc. In2 consists of sixteen elements numbered 16-31 that correspond to lower case letters a-p, such that 16=a, 17=b, 18=c, etc. The pattern vector, pattern, has 16 numbers, 1, 17, 2, 25, 12, 18, 22, 4, 8, 26, 31, 9, 13, 21, 3, and 28. Therefore, the resulting vector, Vr, formed from n1, in2 and pattern vector, pattern would look like Vr=B, b, C, j, M, c, g, E, I, k, p, J, N, f, D, m.

The vByteShuffle operation is designed to be most useful for SIMD hardware, such as VMX and SPU. However, this does not limit or restrict the generality of the abstraction phase as the virtual byte shuffle operation may easily be extended to a more generic shuffle, one that can encompass other shuffles, which operate on a different basis than a byte movement basis, such as a shuffle that operates one level higher and that works on a short word shuffle, a word shuffle, or a double word shuffle basis. Additionally, any shuffle operation may be constructed so that it accepts any number of input vectors. In such a case, the pattern vector would simply be adjusted to select elements from the input vectors to form an output vector of the proper length.

During the abstraction phase, all operations that exhibit byte movement ability are identified, and rules defining how to abstract the operations into vByteShuffle operations are applied. In an exemplary embodiment, the list of candidate operations comprises the following operations: logical operations including shift left, shift right, select operation, rotate, pack, unpack, merge, and permute.

The above detailed list is not meant to be exhaustive or limit the implementation of the present invention. For different SIMD hardware, different operations will appear in the list. Operations such as realignment or data conversion use permute, pack/unpack operations respectively.

Pattern vectors for the candidate operations are pre-computed and stored in a table. Below are a few examples of a vByteShuffle operation:

(1) inter vector logical shift right 1 byte:
vByteShuffle (in, ZERO, (16,0,1,2,3,4,5,6,7,8,9,10,11,12, 13,14)), where ZERO is a vector filled with zeroes. The pattern vector takes element sixteen, the first element in ZERO, and adds the first 15 elements of in, 0-14 to create the new vector, with element 16, the zero, as the first element in the new vector.

(2) rotate right by 2 bytes:
vByteShuffle (in, in, (14,15,0,1,2,3,4,5,6,7,8,9,10,11,12, 13)). The pattern vector takes the last two elements of vector in, elements fourteen and fifteen, and moves them to the beginning of the new, resulting vector while placing elements 0-13 of vector in into positions 2-15, respectively, of the new resulting vector.

A data reorganization graph is an expression tree annotated with necessary vshiftstream operations on memory accesses, so as to guarantee a valid SIMD computation. A vshiftstream operation is a data reorganization operation introduced for realignment purposes. Therefore, during the abstraction phase, given a data reorganization graph annotated with vshiftstream, visit each operation and express all byte movement operations in vByteShuffle operations. A vshiftstream operation is a data reorganization operation introduced for realignment purposes. For SIMD architectures with alignment constraints, it is often necessary to insert these realignment operations to get the misaligned memory accesses to the correct slot in the vector register.

Begin the clustering phase by transforming the expression tree such that more vByteShuffle operations can be grouped together. Grouping together is important, because, ultimately it allows for more combining during the combination phase, as explained below. All logical operations as well as arithmetic operations under certain circumstances may be clustered. A good example of this is when there is a vByteShuffle operation that is originally a vshiftstream operation, followed by a logical AND operation or a logical OR operation, with a vector mask that comes from replicating a scalar mask. A mask is a pattern of bits or characters designed to be logically combined with an unknown data item to retain or suppress portions of the data item. For example, the bit string "00000011" when logically ANDed with an eight-bit data item, yields a result that retains the last two bits of the eight-bit data item and has zeroes in all the other bit positions. A scalar mask is a mask suitable for application to scalar quantities and a vector mask is a mask applicable to vector quantities. This allows the freedom to move the vByteShuffle operation passing by the AND or OR node on the expression tree. Good candidate virtual shuffle operations to be moved are virtual shuffle operations that represent bitwise operations, but others may be moved as well.

Next, begin the combination phase. Within the expression tree, identify all the vByteShuffle trees. A vByteShuffle tree is a subtree of the expression tree that only contains vByteShuffle operations that operate on input vectors. Grouping vByteShuffle operations together creates more vByteShuffle trees, which allows for increased chances to combine operations. During the combination phase, one or more vByteShuffle trees are collapsed by combining vByteShuffle operations within the vByteShuffle trees. For each vByteShuffle tree perform the following steps. Given a tree of vByteShuffle operations on a set of unique vectors (V1, V2 ... Vn), assign a distinct index value for each byte of the input vectors. Then compute the result of the vByteShuffle operation tree during compile time according to the data dependency implied by the vByteShuffle operation tree. If the vByteShuffle operation involves an operand that is only known at runtime, express the result in terms of unknown variables (m, n, ... ). The result is a result vector (Vr) containing bytes from input vectors (V1, V2 ... Vn). Then transform the result back to the revised vByteShuffle operation tree. Some input vectors can be removed if the resulting vector Vr does not contain any byte indexes that make up the input vectors.

Next is the code generation phase. Each vByteShuffle operation within the revised vByteShuffle tree generates in the target platform an instruction or a sequence of instructions that can perform the vByteShuffle operation efficiently. If the pattern in any vByteShuffle operation in the revised vByteShuffle tree contains unknown variables (m, n, ... ), range analysis of all unknown variables will be performed to generate possible patterns for all combinations of unknown variables (m, n, ... ) at compile time. Code is generated to select the correct pattern based on the runtime value of the unknown variables (m, n, ... ).

FIGS. 5-8 illustrate an exemplary implementation of the exemplary embodiment for eliminating vByteShuffle operations by combining patterns known at compile time.

Figure 5:
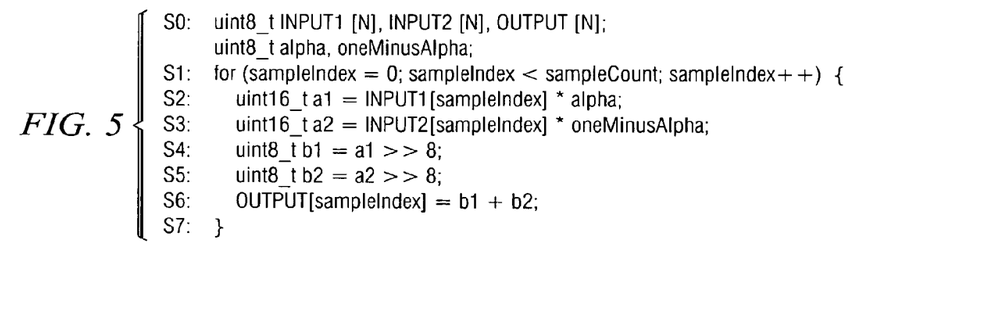
FIG. 5 shows a kernel loop taken from an alphablend benchmark, in accordance with an exemplary embodiment.

FIG. 5 shows a kernel loop taken from an alphablend benchmark, in accordance with an exemplary embodiment of the present invention. The kernel loop is an example of code that exemplary embodiments of the present invention may operate on. The body of the loop is labeled with S2 to S6. Line S0 states "uint8_t INPUT1[N], INPUT2[N], OUTPUT[N]; uint8_t alpha, oneMinusAlpha;". Line S1 states "for (sampleindex=0; sampleIndex<sampleCount; sampleIndex++) {". Line S2 states "uint16_t a1=INPUT1[sampleIndex]*alpha;". Line S3 states "uint16_t a2=INPUT2[sampleIndex]* oneMinusAlpha;". Line S4 states "uint8_t b1=a1>>8;". Line S5 states "uint8_t b2=a2>>8;". Line S6 states "OUTPUT [sampleIndex]=b1+b2;". Line S7 states "}". Focusing on S2 and S4 will illustrate an exemplary embodiment of the present invention. Since S3 and S5 perform the same operations as S2 and S4, the same mechanics may be applied to them. After propagating S2 into S4, the expression trees before and after simdization are given in FIGS. 6A and 6B, respectively.

Figure 6A:
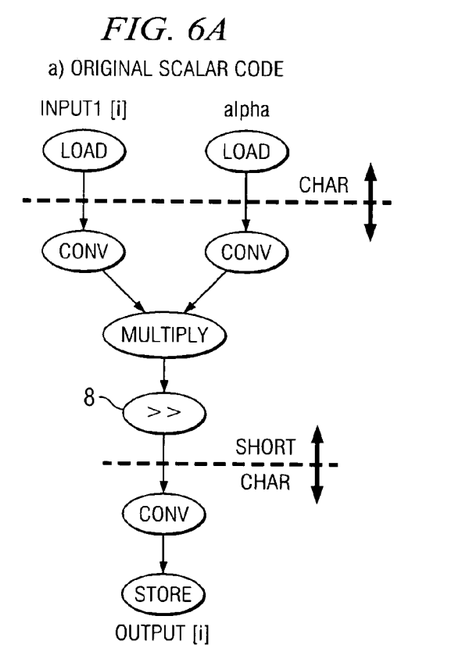
FIGS. 6A and 6B show an expression tree for kernel computation of an alphablend, in accordance with an exemplary embodiment.
Figure 6B:
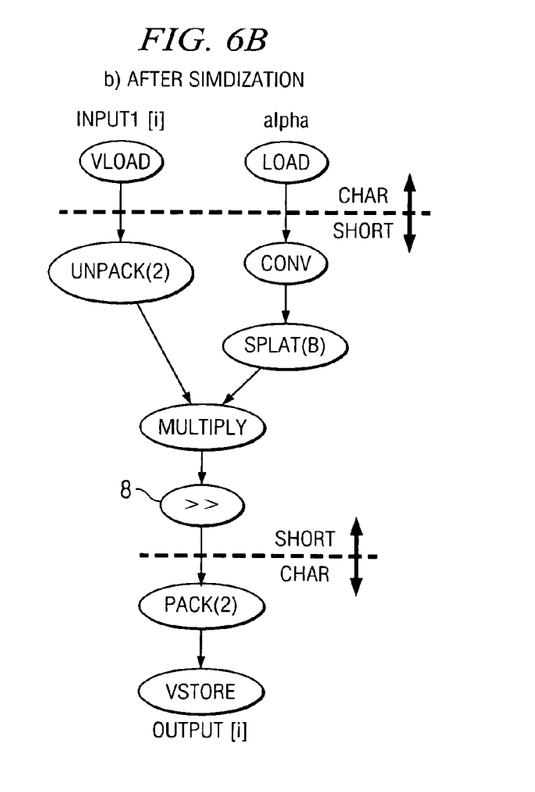

FIGS. 6A and 6B show an expression tree for kernel computation of an alphablend, in accordance with an exemplary embodiment. Consider the following equation:

(CONV to uint8_t)(((CONV to uint16_t)LOAD(INPUT1)*( CONV to uint16_t)alpha)>>8)

This equation describes the transformation of S2, FIG. 5, from an 8-bit unsigned char form to a 16-bit unsigned short form before multiplication. The result of the SIMD multiplication would then be in unsigned short form. This implementation applies a novel process that determines the shortest precision conversion length. The default conversion, according to ANSI C standard, is to convert unsigned char to unsigned int, then to unsigned short after multiplication. Thus, the multiplication would be done on a four-byte element length. As a vector contains sixteen byte elements, the default conversion provides four-way parallelism. That is, each vector can contain four parallel sets of data to be operated on at one time. However, when multiplying two chars, the result may be, at most, two bytes long. Therefore, converting to unsigned int is not necessary. Thus, in the exemplary embodiment, unsigned char is converted to unsigned short, which is two bytes long. Thus, as a vector contains sixteen byte elements the present implementation provides eight-way parallelism. That is, each vector can contain eight parallel sets of data to be operated on at one time.

FIG. 6A illustrates the implicit conversion of S2 from the original user code char form to a 16 bit short form. INPUT1[i] and constant alpha are loaded, LOAD, one element at time. These elements are converted, CONV, one at a time into short form and then multiplied, MULTIPLY, together. Next, the result is shifted right by eight characters, as indicated by the 8 pointing to the shift right symbol, >>. The shifted result is then converted, CONV, from short back to char and stored, STORE, as OUTPUT1[i].

FIG. 6B illustrates conversion of S2 to a 16-bit unsigned short form after S2 has been converted to a SIMD architecture. Converting S2 to a SIMD architecture involves vectorizing the input for the SIMD architecture. Vectorizing is the converting of scalar values into a vector form. Since INPUT1 [i] is an array of type uint8_t, a vector load gets sixteen data elements into a vector register. Converting a vector of uint8_t elements into two vectors of uint16_t elements requires zero-extending each byte element of INPUT1[i] into a size uint16_t. Zero-extending means taking the original vector and adding an appropriate number zeroes to each element of the original vector to create a new, longer vector where each element has the appropriate length. In SIMD architecture, if zero-extending causes the new vector to be longer than sixteen bytes it will be necessary to split the resulting vector into two or more vectors. INPUT1[i] is vector loaded, VLOAD, and unpacked by a factor of two into two vectors UNPACK (2). One constant alpha is loaded, LOAD, and converted, CONV, into unsigned short form before being splatted eight times, SPLAT(8), in the vector. Splatting replicates the scalar value across the vector to fill the vector. The splatted alpha is multiplied, MULTIPLY, with both of the unpacked INPUT1 [i] vectors. Each unsigned short element of the resulting vectors is shifted right by eight characters, as indicated by the 8 pointing to the shift right symbol, >>. The right shifted vectors are then packed back into a single vector, PACK(2), and stored, VSTORE, as OUTPUT1[i].

Figure 7:
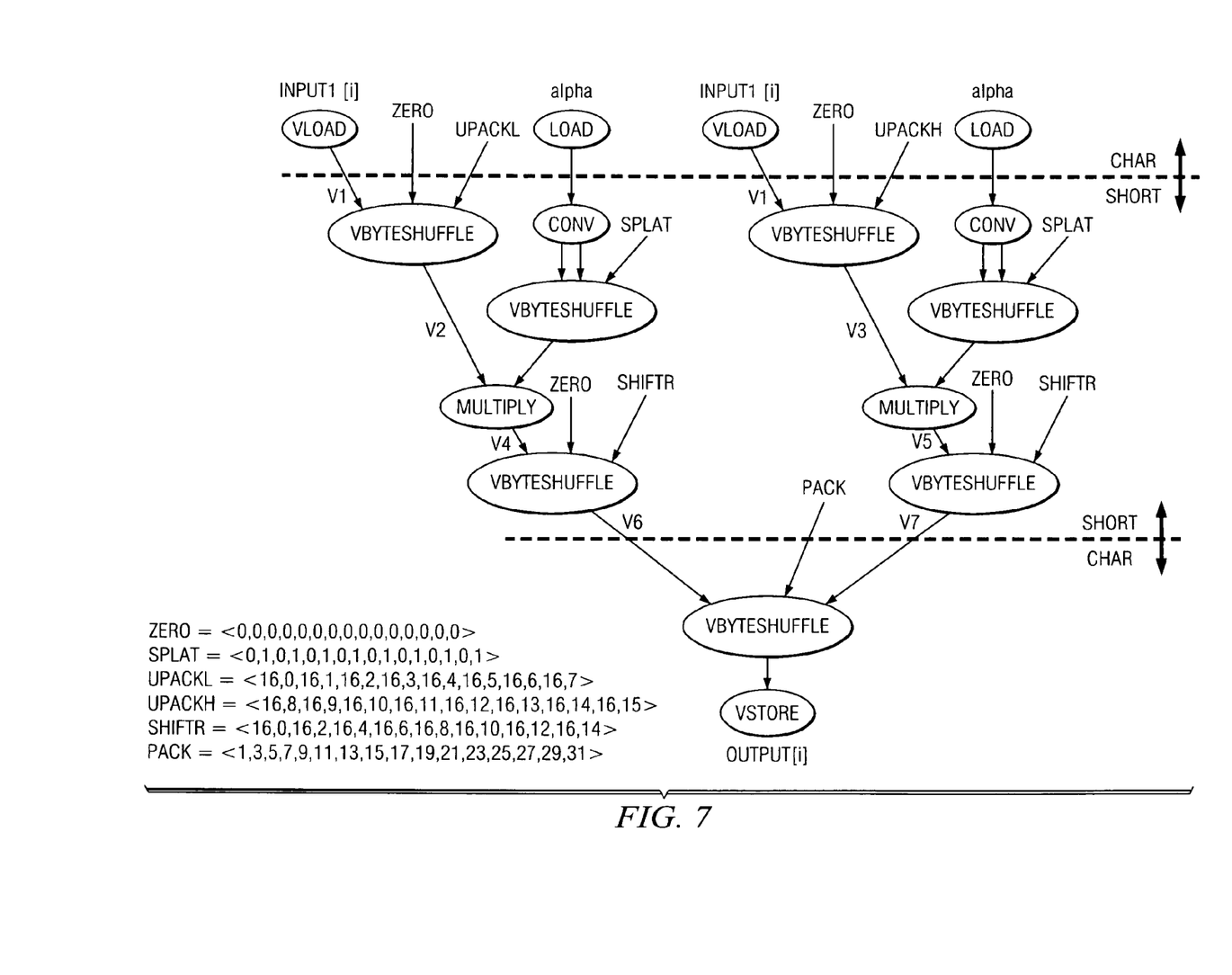
FIG. 7 depicts an expression tree, for a Single Issue Multiple Data architecture, for an alphablend after the abstraction phase, in accordance with an exemplary embodiment.

FIG. 7 depicts an expression tree, for a Single Issue Multiple Data architecture, for an alphablend after the abstraction phase, in accordance with an exemplary embodiment. FIG. 7 illustrates abstracting unpack, splat, shift right, and pack operations into vByteShuffle operations. Explanation of the nodes starts from the leaf nodes of INPUT1[i] vector.

Since INPUT1[i] is an array of type uint8_t, a vector load gets sixteen data elements into a vector register. The vector register is referred to as register V1 and the bytes are numbered from 0 through 15. The bytes for vector ZERO are numbered from 16 through 31. Converting a vector of uint8_t elements into two vectors of uint16_t elements requires zero-extending each byte element of V1 into size uint16_t. For clarity, the two resulting vectors are referred to as V2 and V3. This is precisely doing vector unpacking with vector ZERO. Two unpack patterns are needed. For handling the lower eight bytes, the UNPACKL pattern vector is used and for the upper eight bytes, the UNPACKH pattern vector is used. The two resulting vByteShuffles are expressed as follows:
vByteShuffle(vload(INPUT[i]), ZERO, UNPACKL)
vByteShuffle(vload(INPUT[i]), ZERO, UNPACKH)
Therefore, vectors V2 and V3 may be expressed as:
V2: vByteShuffle(V1, ZERO, UNPACKL: (16,0,16,1,16,2, 16,3,16,4,16,5,16,6,16,7))
V3: vByteShuffle(V1, ZERO, UNPACKH: (16,8,16,9,16,10, 16,11,16,12,16,13,16,14,16,15))

The constant alpha is also an uint8_t which needs to be zero-extended to an uint16_t when loaded into a vector register. Assuming it is loaded into the first slot of the vector register, it needs to be splatted, or replicated, eight times. The replication is expressed as a SPLAT pattern of (0,1,0,1,0,1,0, 1,0,1,0,1,0,1,0,1), to fill the result vector with the first two bytes of the input vector.

Next, the splatted alpha vector is multiplied with both vectors V2 and V3. The resulting vectors are referred to as V4 and V5. Therefore V2 multiplied by alpha equals V4 and V3 multiplied by alpha equals V5.

Then a logical shift right by one byte ($8*k$ bits, $k=1$) is applied to every element of vectors V4 and V5. Zero bits are shifted in from the left. The operation of shifting right is expressed as a byte shuffle of the original vector with vector ZERO. The SHIFTR pattern is (16,0,16,2,16,4,16,6,16,8,16, 10,16,12,16,14), which chooses a zero byte from vector ZERO to fill in every even numbered byte. The two resulting vByteShuffle operations are expressed as follows:
vByteShuffle(V4, ZERO, SHIFTR)
vByteShuffle(V5, ZERO, SHIFTR)
For clarity, the shifted result vectors are referred to as V6 and V7.

Converting each element of vectors V6 and V7 from uint16_t back to uint8_t requires extracting the lower byte of the two byte element. This is precisely performing vector packing, which is expressed as the vByteShuffle operation:
vByteShuffle(V6,V7, PACK)
The pattern vector PACK has a pattern of: (1,3,5,7,9,11,13, 15,17,19,21,23,25,27,29,31).

In the present example, there are no operations to cluster, so nothing happens during the clustering phase. Next is the combination phase. There is one vByteShuffle tree in FIG. 7, which is the subtree of two vByteShuffle operations for shift right feeding into the pack vByteShuffle operation.

Vector V4 is re-labeled as 0 through 15, vector V5 is re-labeled as 16 through 31 and vector ZERO is re-labeled as 32 through 47. The two SHIFTR masks are translated to the following to account for the re-labeling, which results in vectors V6 and V7:
V6: vByteShuffle(V4, ZERO, PATTERN1: (32,0,32,2,32,4, 32,6,32,8,32,10,32,12,32,14))
V7: vByteShuffle(V5, ZERO, Pattern2: (32,16,32,18,32,20, 32,22,32,24,32,26,32,28,32,30))

Now the vByteShuffle tree looks as follows: the new vectors V6 and V7 are input into the pack vByteShuffle operation to form:
vByteShuffle(V6, V7, PATTERN3: (1,3,5,7,9,11,13,15,17,19,21,23,25,27,29,31)).
The vByteShuffle tree is computed at compile time:
COMBINED=vByteShuffle(PATTERN1, PATTERN2, PATTERN3)=(0,2,4,6,8,10,12,14,16,18,20,22,24,26,28,30)

Figure 8:
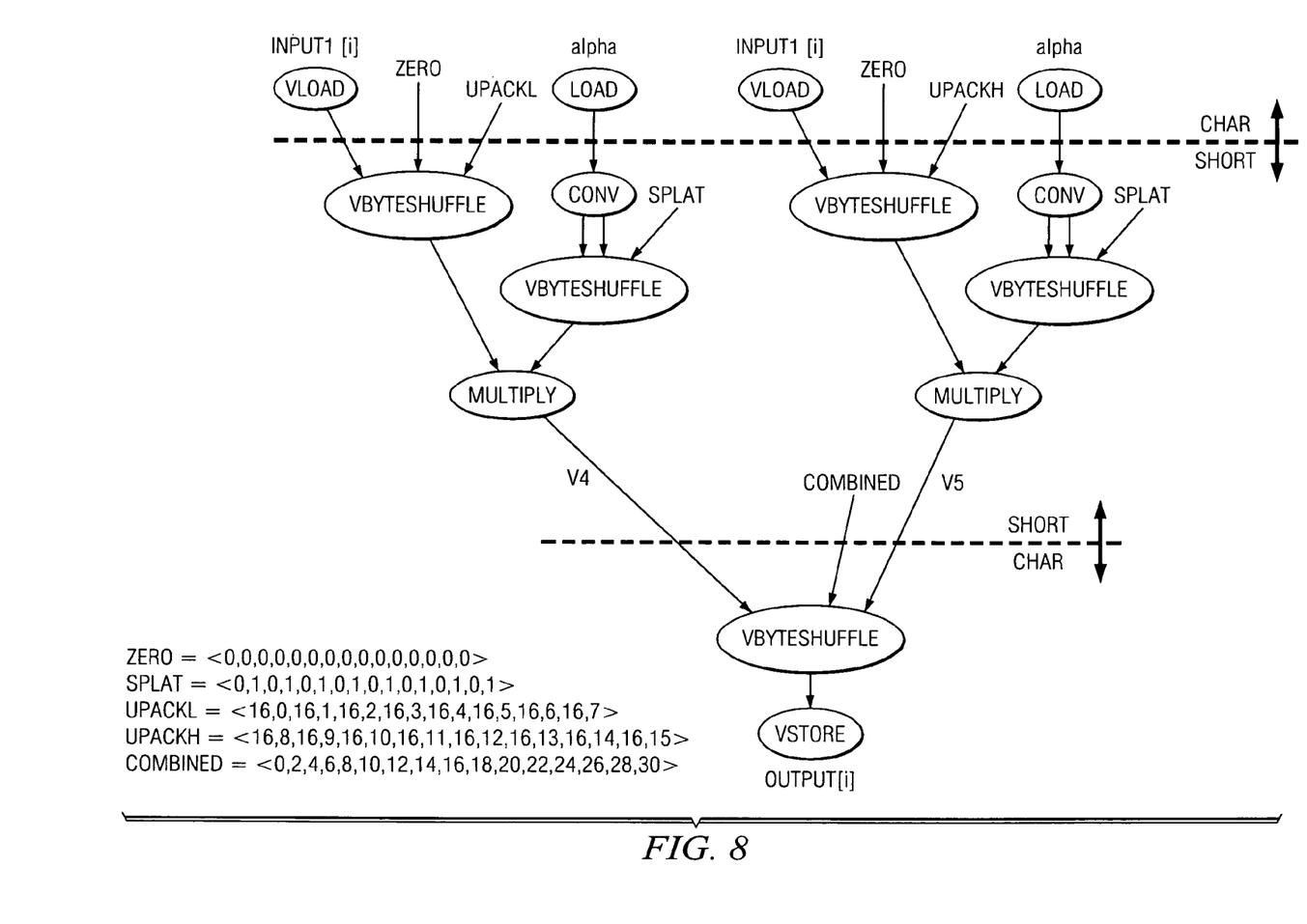
FIG. 8 depicts an expression tree, for a Single Issue Multiple Data architecture, for an alphablend after the combination phase, in accordance with an exemplary embodiment.

Examining the byte numberings in COMBINED, reveals that all the numbers fall in the ranges of 0 through 15 and 16 through 31. Vector V4 is numbered from 0 through 15 and vector V5 is numbered from 16 through 31 and ZERO is numbered from 32 through 47. Since the numberings of the elements of COMBINED fall into two ranges, i.e. the two input vectors V4 and V5, the three vByteShuffle operations can be collapsed into one vByteShuffle operation with input vectors V4 and V5 and a pattern vector, COMBINED. FIG. 8 shows the resulting ByteShuffle tree:
vByteShuffle (V4, V5, COMBINED)

FIG. 8 depicts an expression tree, for a Single Issue Multiple Data architecture, for an alphablend after the combination phase, in accordance with an exemplary embodiment. FIG. 8 is the same as FIG. 7 up until the point where V2 and V3 are multiplied with the splatted alpha constant. The two resulting vectors, V4 and V5 are now input in a vByteShuffle operation with the COMBINED pattern vector in order to yield the output vector OUTPUT1[i]. Thus, two shuffle operations are saved. During the code generation phase, the resulting vByteShuffle operation is mapped into a vec_perm instruction as follows:
vByteShuffle(V4,V5,COMBINED)=>vec_perm(V4, V5,(0, 2,4,6,8,10,12,14,16,18,20,22,24,26,28,30)).

Figure 9:
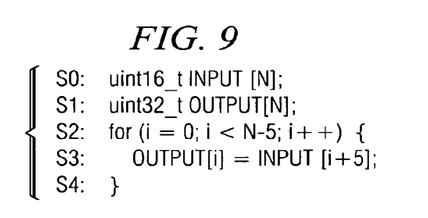
FIG. 9 shows a copy loop taken with a length conversion, in accordance with an exemplary embodiment.

FIG. 9 shows a copy loop taken with a length conversion, in accordance with an exemplary embodiment. The copy loop is an example of code that exemplary embodiments of the present invention may operate on. The body of the loop is labeled with S2 to S3. Line S0 states "uint16_t INPUT[N];". Line S1 states "uint32_t OUTPUT[N];". Line S2 states "for (i=0; i<N-5; i++) {". Line S3 states "OUTPUT[i]=INPUT [i+5];". Line S4 states "}". FIG. 9 is used to illustrate an example of code generation of vByteShuffles for architecture specific opcodes.

Figure 10:
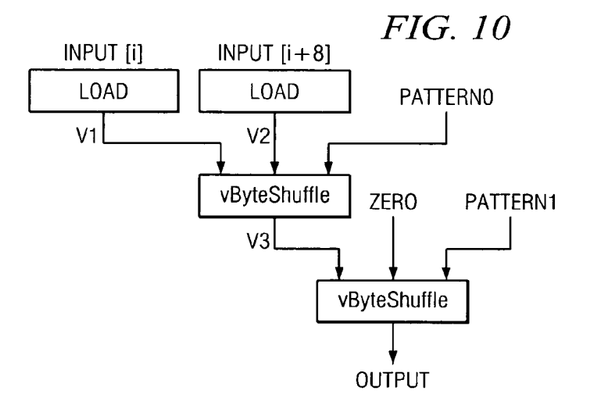
FIG. 10 depicts an abstracted vByteShuffle tree for a copy loop with a length conversion, in accordance with an exemplary embodiment.

FIG. 10 depicts an abstracted vByteShuffle tree for a copy loop with a length conversion, in accordance with an exemplary embodiment. The equation OUTPUT[i]=(CONV to uint32_t) ALIGN (LOAD (INPUT[i]), LOAD(INPUT[i+8]), 5*2)

describes the expression tree for S3 of FIG. 9. For the present example, it is assumed that the base addresses of both INPUT and OUTPUT arrays are aligned on 16-byte boundary.

First, the expression tree for S3 of FIG. 9 needs to be abstracted. So, two vectors V1 and V2, each containing 8 uint16_t elements, are loaded:
LOAD(INPUT[i]) LOAD(INPUT[i+8])
Thus, there are 16 uint16_t elements in total after vectors V1 and V2 are concatenated. The bytes in the concatenated vector are numbered from 0 through 31.

Next, the concatenated vector is aligned so that the 5th uint16_t element is at slot 0:
ALIGN (LOAD(INPUT[i]), LOAD(INPUT[i+8]), 5*2))
Since each uint16_t element is 2 bytes in length, this translates into a shift left by 5*2 bytes. Expressing ALIGN as a vByteShuffle, yields the following vbyteShuffle operation:
V3: vByteShuffle(V1, V2, PATTERN0)
where PATTERN0 is (10,11,12,13,14,15,16,17,18,19,20,21, 22,23,24,25).

As shown in the first example above, in FIGS. 5-8, zero-extending, that is, converting to uint32_t:
(CONV to uint32_t) ALIGN (LOAD(INPUT[i]), LOAD(INPUT[i+8]), 5*2)
may be expressed as a vByteShuffle with a zero vector, ZERO. When zero-extending a vector of 8 uint16_t elements, the result yields two physical vectors, OUTPUT[i] and OUTPUT[i+4], containing 8 uint32_t elements.

Therefore, for OUTPUT[i], input arrays INPUT[i] and INPUT [i+8], are vector loaded into vectors V1 and V2, which are inputs to a vByteShuffle operation with pattern vector, PATTERN0, to yield vector V3, which may be expressed as:

V3: vByteShuffle(V1, V2, PATTERN0: (10,11,12,13,14,15, 16,17,18,19,20,21,22,23,24,25)).

Vector V3 and the zero vector, ZERO, are inputs to a vByteShuffle operation with pattern vector, PATTERN1a, wherein the pattern vector, PATTERN1a, handles the first eight bytes of vector V3, bytes 0 through 7, which yields OUTPUT[i], which is expressed as:

OUTPUT[i]: vByteShuffle(V3, ZERO, PATTERN1: (16,16, 0,1,16,16,2,3,16,16,4,5,16,16,6,7))

For OUTPUT[i+4], input arrays INPUT[i] and INPUT [i+8], are vector loaded into vectors V1 and V2, which are inputs to a vByteShuffle operation with pattern vector, PATTERN0, to yield vector V3, which may be expressed as:

V3: vByteShuffle(V1, V2, PATTERN0: (10,11,12,13,14,15, 16,17,18,19,20,21,22,23,24,25)).

Vector V3 and the zero vector, ZERO, are inputs to a vByteShuffle operation with pattern vector, PATTERN1b, wherein the pattern vector, PATTERN1b, differs from pattern vector PATTERN1a in order to address the latter eight bytes of vector V3, bytes 8 through 15, which yields OUTPUT[i+4], which is expressed as:

OUTPUT[i+4]: vByteShuffle(V3, ZERO, PATTERN1: (16, 16,8,9,16,16,10,11,16,16,12,13,16,16,14,15))

For simplicity, pattern vectors PATTERN1a and PATTERN1b are both denoted in FIG. 10 by the reference "PATTERN1".

As there are no operations to cluster, nothing happens during the clustering phase. During the combination phase, the vByteShuffle operations are identified as a vByteShuffle tree and the vByteShuffle operations are combined. Vector V1 is renumbered as 0 through 15, vector V2 is renumbered as 16 through 31 and vector zero is renumbered as 32 through 47. After combining pattern vectors the two outputs yield:

OUTPUT[i]: vByteShuffle(V3, ZERO, COMBINED_PATTERN1:
(32,32,10,11,32,32,12,13,32,32,14,15,32,32,16,17))

OUTPUT[i+4]: vByteShuffle(V3, ZERO, COMBINED_PATTERN2:
(32,32,18,19,32,32,20,21,32,32,22,23,32,32,24,25))

Examining the ranges of numbers in COMBINED_PATTERN1 reveals that the numbers fall in three ranges: 0 through 15, 16 through 31, and 32 through 47. Therefore, the first vByteShuffle operation needs to be devirtualized into two hardware PERM instructions for the VMX hardware. Thus, there are no vByteShuffle operation savings in this case. However, for the SPU architecture, the SHUFB instruction is capable of doing permute as well as filling up predestined bytes with values 00 or FF patterns. Because number 32 comes from ZERO, the vByteShuffle operation can still be translated into one instruction for the SPU hardware. Hence, one vByteShuffle operation is saved.

During the code generation phase, the code generated for the SPU hardware will contain two SHUFB instructions as follows:

SHUFB(V1, V2, COMBINED_PATTERN1:
(128, 128, 10, 11, 128, 128, 12, 13, 128, 128, 14, 15, 128, 128, 16, 17)
)
SHUFB(V1, V2, COMBINED_PATTERN2:
(128, 128, 18, 19, 128, 128, 20, 21, 128, 128, 22, 23, 128, 128, 24, 25)
)

The number 128 signals the hardware to fill the corresponding target byte with value 00.

In order to illustrate handling runtime patterns, use the previous example but assume that the base of the INPUT and OUTPUT arrays are runtime aligned. That is, INPUT is aligned on a two-byte boundary and OUTPUT is aligned on a four-byte boundary. The same analysis that occurred in the previous example, occurs except now that the ALIGN amount is not known to be 5*2 bytes. Hence, PATTERN0 will be a pattern with variable byte numbering, incrementing by one. Therefore, the ALIGN amount is substituted with a variable n. This yields the following combined patterns:

OUTPUT[i]: vByteShuffle(V3, ZERO, COMBINED_PATTERN1: (32,32,n,n+1,32,32,n+2,n+3,32,32,n+4,n+5,32, 32,n+6,n+7))

OUTPUT[i+4]: vByteShuffle(V3, ZERO, COMBINED_PATTERN2: (32,32,n+8,n+9,32,32,n+10,n+11,32,32,n+ 12,n+13,32,32,n+14,n+15))

Since n is not known at compile time, a constant table will need to be populated at compile time, with all possible combine patterns where n varies from 0 through 15. At runtime, the alignment will be used as an index to load the particular combine patterns. This incurs no extra load overhead as the patterns always had to be loaded from memory. However, this does incur memory overhead as more space is used to store different possible combine patterns.

The generated code for SPU will contain two SHUFB instructions with patterns that are loaded at runtime using n as index:

SHUFB(V1, V2, LOAD PATTERN (n))
SHUFB(V1, V2, LOAD PATTERN (n))

Figure 11:
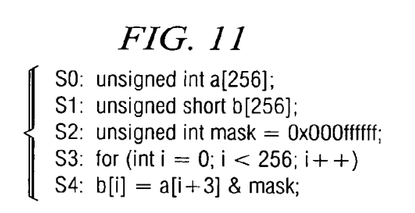
FIG. 11 shows code for extracting bits of data, in accordance with an exemplary embodiment.

FIG. 11 shows code for extracting bits of data, in accordance with an exemplary embodiment. The code for extracting bits of data is an example of code that exemplary embodiments of the present invention may operate on. In this example, the code will extract the lower twenty-four bits of data. The body of the loop is labeled with S3 and S4. Line S0 states "unsigned int a[256];". Line S1 states "unsigned short b[256];". Line S2 states "unsigned int mask=0x00ffffff;". Line S3 states "for (int i=0; i<256; i++)". Line S4 states "b[i]=a[i+3] & mask;".

Figure 12:
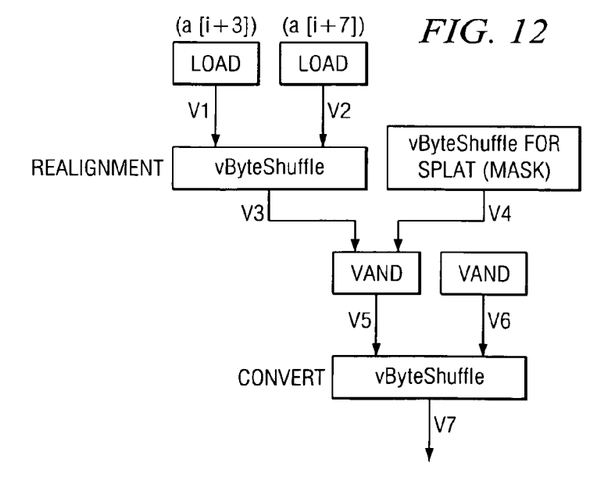
FIG. 12 depicts an abstracted vByteShuffle tree, in accordance with an exemplary embodiment.

FIG. 12 depicts an abstracted vByteShuffle tree, in accordance with an exemplary embodiment of the present invention. For simplicity, the patterns for REALIGNMENT and CONVERT are not shown. The example vByteShuffle tree involves converting from unsigned int to unsigned short. Vectors V1 and V2 are input into a vByteShuffle operation along with pattern vector REALIGNMENT to yield vector V3. Vector V4 is the result of a vByteShuffle operation to splat the mask value. Vectors V3 and V4 are input in a VAND operation to yield vector V5. Vectors V5 and V6 are input into a vByteShuffle operation along with pattern vector CONVERT to yield vector V7. Vector V6 is the result of a VAND operation from the symmetrical right side of the input tree. The right side of the tree is omitted for simplicity, and is identical to the depicted left side except that the initial inputs would be a[i+7] and a[i+11].

Examining the expression tree reveals that there are no vByteShuffle trees to be identified as the two input vByteShuffle operations are separated by the VAND operations before feeding into the last vByteShuffle operation. However, as the two input vByteShuffle operations are separated by a logical AND operation, clustering is possible.

Figure 13:
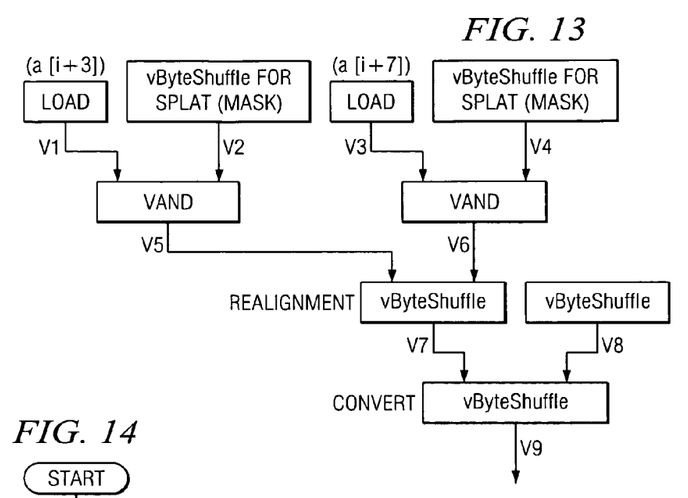
FIG. 13 depicts an expression tree after the clustering phase, in accordance with an exemplary embodiment.

FIG. 13 depicts an expression tree after the clustering phase, in accordance with an exemplary embodiment. For simplicity, the patterns for REALIGNMENT and CONVERT are not shown. Vector V1 is the load vector for input a[i+3].

Vector V2 is the result of a vByteShuffle operation for the splat mask. Vectors V1 and V2 are input into Vector V5 in a VAND operation. Vector V3 is the load vector for input a[i+7]. Vector V4 is the result of a vByteShuffle operation for the splat mask. Vectors V3 and V4 are input into Vector V6 in a VAND operation. Vectors V5 and V6, along with pattern vector REALIGNMENT, are input in a vByteShuffle operation to yield vector V7. Vectors V7 and V8, along with pattern vector CONVERT, are input in a vByteShuffle operation to yield vector V9. Vector V8 is the result of a vByteShuffle operation from the symmetrical right side of the input tree. The right side of the tree is omitted for simplicity, and is identical to the depicted left side except that the initial inputs would be a[i+7] and a[i+11].

The two vByteShuffle operations, V7 and V8 are feeding into another vByteShuffle operation, V9, forming a vByte-Shuffle tree, which may be combined during the combination phase.

Figure 14:
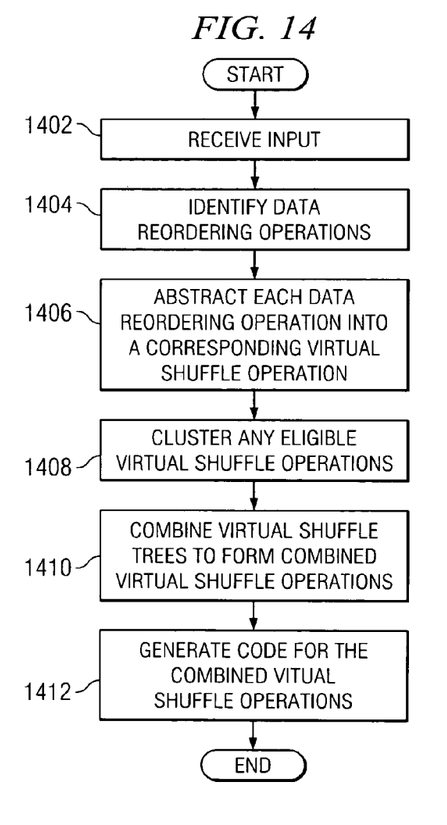
FIG. 14 is a flowchart illustrating the operation of analyzing and reducing data reordering operations in Single Issue Multiple Data code, in accordance with an exemplary embodiment.

FIG. 14 is a flowchart illustrating the operation of analyzing and reducing data reordering operations in Single Issue Multiple Data code, in accordance with an exemplary embodiment. The operation begins when input is received (step 1402). The operation identifies the data reordering operations within the input (step 1404). The operation abstracts each data reordering operation into a corresponding virtual shuffle operation (step 1406). The virtual shuffle operations form an expression tree. The operation then clusters any eligible virtual shuffle operations (step 1408). An eligible virtual shuffle operation is a virtual shuffle operation that follows any logical operation, or a virtual shuffle operation that follows an arithmetic operation, under certain circumstances. The operation then collapses virtual shuffle trees, which are sub-trees of the expression tree that only contain virtual shuffle operations, by combining virtual shuffle operations within the virtual shuffle trees to form combined virtual shuffle operations (step 1410). Then the operation generates code for the combined virtual shuffle operations (step 1412). Then the operation ends.

Thus the exemplary embodiments provide a method, system and computer program product for analyzing and reducing byte movement operations in SIMD code.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for analyzing data reordering operations in Single Issue Multiple Data source code and generating executable code therefrom, the computer implemented method comprising:

receiving input;

identifying one or more data reordering operations in the input;

abstracting each data reordering operation within the one or more data reordering operations into a corresponding virtual shuffle operation so that each virtual shuffle operation forms part of an expression tree;

collapsing one or more virtual shuffle trees by combining virtual shuffle operations within at least one of the one or more virtual shuffle trees to form one or more combined virtual shuffle operations, wherein each virtual shuffle tree is a subtree of the expression tree that only contains virtual shuffle operations; and generating code for the one or more combined virtual shuffle operations.

2. The computer implemented method of claim 1, further comprising:

clustering virtual shuffle operations to form one or more virtual shuffle trees.

3. The computer implemented method of claim 2, wherein the virtual shuffle operations to be clustered to form one or more virtual shuffle trees are virtual shuffle operations that represent bitwise operations.

4. The computer implemented method of claim 1, further comprising:

where the input is not already vectorized for Single Issue Multiple Data architecture, vectorizing the input for Single Issue Multiple Data architecture.

5. The computer implemented method of claim 1, wherein the one or more data reordering operations comprise at least one of a logical shift left operation, a logical shift right operation, a select operation, a rotate operation, a pack operation, an unpack operation, a merge operation, or a permute operation.

6. The computer implemented method of claim 1, wherein the data reordering operations are byte movement operations, and wherein at least one of the one or more combined virtual shuffle operations have corresponding data reordering operations that are configured to operate on elements of different lengths.

7. The computer implemented method of claim 6, wherein each virtual shuffle operation accepts two input vectors and a pattern vector.

8. The computer implemented method of claim 1, wherein the data reordering operations are configured to operate on elements of different lengths and wherein each data reordering operation is one of a short word movement operation, a word movement operation, or a double word movement operation, and wherein at least one of the one or more combined virtual shuffle operations have corresponding data reordering operations that are configured to operate on the elements of different lengths.

9. A computer program product comprising a computer usable storage medium having stored therein computer usable program code for analyzing data reordering operations in Single Issue Multiple Data source code and generating executable code therefrom, said computer program product comprising:

computer usable program code for receiving input;

computer usable program code for identifying one or more data reordering operations in the input;

computer usable program code for abstracting each data reordering operation within the one or more data reordering operations into a corresponding virtual shuffle operation so that each virtual shuffle operation forms part of an expression tree;

computer usable program code for collapsing one or more virtual shuffle trees by combining virtual shuffle operations within at least one of the one or more virtual shuffle trees to form one or more combined virtual shuffle operations, wherein each virtual shuffle tree is a subtree of the expression tree that only contains virtual shuffle operations; and computer usable program code for generating code for the one or more combined virtual shuffle operations.

10. The computer program product of claim 9, further comprising:

computer usable program code for clustering virtual shuffle operations to form one or more virtual shuffle trees.

11. The computer program product of claim 10, wherein the virtual shuffle operations to be clustered to form one or more virtual shuffle trees are virtual shuffle operations that represent bitwise operations.

12. The computer program product of claim 9, further comprising:

computer usable program code for vectorizing the input for Single Issue Multiple Data architecture where the input is not already vectorized for Single Issue Multiple Data architecture.

13. The computer program product of claim 9, wherein the one or more data reordering operations comprise at least one of a logical shift left operation, a logical shift right operation, a select operation, a rotate operation, a pack operation, an unpack operation, a merge operation, or a permute operation.

14. The computer program product of claim 9, wherein the data reordering operations are byte movement operations, and wherein at least one of the one or more combined virtual shuffle operations have corresponding data reordering operations that are configured to operate on elements of different lengths.

15. The computer program product of claim 14, wherein the virtual shuffle operation accepts two input vectors and a pattern vector.

16. The computer program product of claim 9, wherein the data reordering operations are configured to operate on elements of different lengths and wherein each data reordering operation is one of a short word movement operation, a word movement operation, or a double word movement operation, and wherein at least one of the one or more combined virtual shuffle operations have corresponding data reordering operations that are configured to operate on the elements of different lengths.

17. A data processing system for analyzing data reordering operations in Single Issue Multiple Data source code and generating executable code therefrom, said data processing system comprising:

a storage device, wherein the storage device stores computer usable program code; and a processor, wherein the processor executes the computer usable program code to receive input; identify one or more data reordering operations in the input; abstract each data reordering operation within the one or more data reordering operations into a corresponding virtual shuffle operation so that each virtual shuffle operation forms part of an expression tree; collapse one or more virtual shuffle trees by combining virtual shuffle operations within at least one of the one or more virtual shuffle trees to form one or more combined virtual shuffle operations, wherein each virtual shuffle tree is a subtree of the expression tree that only contains virtual shuffle operations; and generate code for the one or more combined virtual shuffle operations.

18. The data processing system of claim 17, wherein the processor further executes computer usable program code to cluster one or more virtual shuffle operations to form one or more virtual shuffle trees.

19. The data processing system of claim 17, wherein the data reordering operations are byte movement operations, and wherein at least one of the one or more combined virtual shuffle operations have corresponding data reordering operations that are configured to operate on elements of different lengths.

20. The data processing system of claim 19, wherein the virtual shuffle operation accepts two input vectors and a pattern vector.

* * * * *